US012661810B2

(12) United States Patent
Na et al.

(10) Patent No.: US 12,661,810 B2
(45) Date of Patent: Jun. 23, 2026

(54) METHOD FOR ASSESSING AN OBJECT METHOD FOR MANIPULATING AN OBJECT, OPTICAL SYSTEM AND MANIPULATION SYSTEM

(71) Applicant: CYNLR SA, Lausanne (CH)

(72) Inventors: Gokul Na, Bengaluru (IN); Nikhil Ramaswamy, Bengaluru (IN)

(73) Assignee: CYNLR SA, Lausanne (CH)

( * ) Notice: Subject to any disclaimer, the term of this patent is extended or adjusted under 35 U.S.C. 154(b) by 105 days.

(21) Appl. No.: 18/646,831

(22) Filed: Apr. 26, 2024

(65) Prior Publication Data
US 2024/0359345 A1 Oct. 31, 2024

(30) Foreign Application Priority Data

Apr. 27, 2023 (DE) ..................... 10 2023 110 832.8

(51) Int. Cl.
| | |
|---|---|
| *B25J 9/16* | (2006.01) |
| *B25J 19/02* | (2006.01) |
| *G01B 11/25* | (2006.01) |

(52) U.S. Cl.
CPC ........... *B25J 19/023* (2013.01); *B25J 9/1697* (2013.01); *G01B 11/25* (2013.01)

(58) Field of Classification Search
CPC .... B23K 9/328; B23K 9/0956; B23K 9/0953; B23K 9/32; B25J 11/005; B25J 13/086; B25J 13/087; B25J 19/023
See application file for complete search history.

(56) References Cited

U.S. PATENT DOCUMENTS

| | | | | |
|---|---|---|---|---|
| 3,627,918 A | * | 12/1971 | Redpath | ................. G01C 11/00 |
| | | | | 356/394 |
| 4,418,993 A | * | 12/1983 | Lipton | ................. H04N 13/296 |
| | | | | 352/62 |

(Continued)

FOREIGN PATENT DOCUMENTS

| | | | | |
|---|---|---|---|---|
| CN | 101825445 B | * | 11/2011 | |
| CN | 102574288 B | * | 9/2014 | ............. B26D 5/005 |

(Continued)

OTHER PUBLICATIONS

"A survey of sensor planning in computer vision;" Tarabanis et al., IEEE Transactions on Robotics and Automation (vol. 11, Issue: 1, 1995, pp. 86-104); Sep. 18, 1995. (Year: 1995).*

(Continued)

*Primary Examiner* — Khoi H Tran
*Assistant Examiner* — Jorge O Peche
(74) *Attorney, Agent, or Firm* — Norman B. Thot

(57) ABSTRACT

A method for an optical acquisition of physical features of an object with an optical system. The method includes aligning the optical system towards an object position so that a first and a second optical device of the optical system gain optical access to the object position, assessing the object with the first and the second optical device from a first perspective so that the first and the second optical device engage with the object along a first and a second optical axis from the first perspective, respectively, adjusting first and the second adjustable spacial filters to a defined spacial adjustment with a defined spacial adjustment parameter, deriving a distance between the optical system and the object from the defined spacial adjustment parameter so as to derive a first distance information between the optical system and the object, and acquiring at least one physical feature of the object.

20 Claims, 4 Drawing Sheets

(56)                    References Cited

U.S. PATENT DOCUMENTS

| | | | | | |
|---|---|---|---|---|---|
| 4,667,236 | A * | 5/1987 | Dresdner | H04N 5/2628 | 348/581 |
| 4,734,756 | A * | 3/1988 | Butterfield | H04N 13/15 | 348/E13.058 |
| 4,825,393 | A * | 4/1989 | Nishiya | G01B 11/00 | 348/E13.008 |
| 5,101,268 | A * | 3/1992 | Ohba | G06V 10/147 | 348/51 |
| 5,142,642 | A * | 8/1992 | Sudo | H04N 13/161 | 348/E13.043 |
| 5,166,754 | A * | 11/1992 | Suzuki | G03F 9/7023 | 356/400 |
| 5,175,616 | A * | 12/1992 | Milgram | H04N 13/239 | 348/E13.059 |
| 5,179,441 | A * | 1/1993 | Anderson | H04N 19/597 | 348/E7.039 |
| 5,212,547 | A * | 5/1993 | Otsuki | H04N 5/144 | 348/E5.065 |
| 5,351,105 | A * | 9/1994 | Hirai | G02B 7/28 | 396/121 |
| 5,383,013 | A * | 1/1995 | Cox | G06T 7/593 | 348/E13.014 |
| 5,422,653 | A * | 6/1995 | Maguire, Jr. | H04N 13/156 | 348/E13.058 |
| 5,668,595 | A * | 9/1997 | Katayama | H04N 13/239 | 348/43 |
| 6,229,959 | B1 * | 5/2001 | Suda | G02B 7/346 | 396/50 |
| 7,019,770 | B1 * | 3/2006 | Katz | H04M 3/51 | 379/39 |
| 8,390,686 | B2 * | 3/2013 | Tanaka | G08B 13/19673 | 348/143 |
| 9,446,304 | B2 * | 9/2016 | Matsuura | A63F 13/00 | |
| 9,766,473 | B1 * | 9/2017 | Tamasanis | G01B 5/14 | |
| 9,827,683 | B1 * | 11/2017 | Hance | G06Q 10/087 | |
| 12,094,161 | B2 * | 9/2024 | Kodandaramaiah | H04N 23/90 | |
| 12,457,427 | B2 * | 10/2025 | Itoh | H04N 23/88 | |
| 2003/0117396 | A1 * | 6/2003 | Yoon | H04N 13/239 | 348/E13.016 |
| 2004/0080294 | A1 * | 4/2004 | Nihei | B25J 19/023 | 318/568.16 |
| 2007/0035619 | A1 * | 2/2007 | Yoon | H04N 13/239 | 348/E13.016 |
| 2008/0049100 | A1 * | 2/2008 | Lipton | H04N 13/144 | 348/43 |
| 2008/0316306 | A1 * | 12/2008 | Burkle | B25J 9/1697 | 901/14 |
| 2009/0015462 | A1 * | 1/2009 | Nakanishi | G08G 1/167 | 342/107 |
| 2009/0244064 | A1 * | 10/2009 | Inokuchi | A63F 13/5258 | 345/474 |
| 2010/0149368 | A1 * | 6/2010 | Yamashita | H04N 23/6815 | 348/222.1 |
| 2010/0165320 | A1 * | 7/2010 | Wolf | B29C 65/08 | 356/3 |
| 2013/0158947 | A1 * | 6/2013 | Suzuki | G01B 11/00 | 702/155 |
| 2013/0321592 | A1 * | 12/2013 | Kuno | H04N 13/207 | 348/50 |
| 2014/0046486 | A1 * | 2/2014 | Mimura | B25J 19/023 | 294/213 |
| 2014/0210974 | A1 * | 7/2014 | Yoshino | H04N 25/704 | 348/350 |
| 2015/0241203 | A1 * | 8/2015 | Jordil | G01B 5/0004 | 356/4.01 |
| 2015/0343641 | A1 * | 12/2015 | Maruyama | B25J 19/023 | 901/1 |
| 2016/0158942 | A1 * | 6/2016 | Augenbraun | B25J 11/0085 | 901/10 |
| 2017/0289453 | A1 * | 10/2017 | Makita | H04N 23/6812 | |
| 2018/0029797 | A1 * | 2/2018 | Hance | G05D 1/0234 | |
| 2018/0126553 | A1 * | 5/2018 | Corkum | B25J 9/1697 | |
| 2018/0231375 | A1 * | 8/2018 | Wu | G06T 7/55 | |
| 2018/0272535 | A1 * | 9/2018 | Ogawa | B25J 13/085 | |
| 2019/0246041 | A1 * | 8/2019 | Blott | G06V 10/764 | |
| 2019/0291276 | A1 * | 9/2019 | Asplund | G01B 11/002 | |
| 2020/0014909 | A1 * | 1/2020 | Döring | H04N 13/246 | |
| 2020/0050834 | A1 * | 2/2020 | Niskanen | G06F 18/22 | |
| 2020/0090368 | A1 * | 3/2020 | Szeto | G02B 27/0172 | |
| 2020/0111192 | A1 * | 4/2020 | Numata | G06T 3/20 | |
| 2020/0150771 | A1 * | 5/2020 | Giusti | G01S 13/06 | |
| 2020/0269432 | A1 * | 8/2020 | Beinhofer | B25J 19/023 | |
| 2020/0275018 | A1 * | 8/2020 | Zhang | H04N 23/50 | |
| 2021/0201534 | A1 * | 7/2021 | Liang | G01C 11/02 | |
| 2021/0220997 | A1 * | 7/2021 | Unno | B25J 9/1694 | |
| 2021/0262789 | A1 * | 8/2021 | Zhang | G01B 11/2513 | |
| 2022/0079687 | A1 * | 3/2022 | Sexson | A61B 34/30 | |
| 2022/0124253 | A1 * | 4/2022 | Ossig | G06T 7/80 | |
| 2022/0141393 | A1 * | 5/2022 | Harfouche | G01B 11/245 | 348/125 |
| 2022/0331898 | A1 * | 10/2022 | Sato | B23K 26/032 | |
| 2022/0355412 | A1 * | 11/2022 | Sato | B23K 26/38 | |
| 2023/0187249 | A1 * | 6/2023 | Nagatomo | H10P 72/53 | 257/797 |
| 2023/0211505 | A1 * | 7/2023 | Okura | B25J 19/023 | 700/254 |
| 2023/0256537 | A1 * | 8/2023 | Sato | B23K 26/03 | 700/253 |
| 2024/0280992 | A1 * | 8/2024 | Lee | G05D 1/6987 | |
| 2024/0303772 | A1 * | 9/2024 | Schulze | G06V 10/56 | |
| 2024/0314440 | A1 * | 9/2024 | Jakubi | H04N 23/617 | |
| 2024/0359345 | A1 * | 10/2024 | Na | B25J 19/023 | |
| 2025/0009213 | A1 * | 1/2025 | Hatakeyama | A61B 1/045 | |
| 2025/0097576 | A1 * | 3/2025 | Nakamura | H04N 23/672 | |
| 2025/0170721 | A1 * | 5/2025 | Murayama | B25J 19/023 | |
| 2025/0175698 | A1 * | 5/2025 | Matsumoto | G02B 7/04 | |
| 2025/0203211 | A1 * | 6/2025 | Shimada | H04N 7/18 | |
| 2025/0340313 | A1 * | 11/2025 | Reyntjens | B64D 1/18 | |

FOREIGN PATENT DOCUMENTS

| | | | | | | |
|---|---|---|---|---|---|---|
| JP | | 2000115621 | A | * | 4/2000 | |
| JP | | 2003207571 | A | * | 7/2003 | |
| JP | | 2004120095 | A | * | 4/2004 | |
| JP | | 2004208211 | A | * | 7/2004 | |
| JP | | 2021-190972 | A | | 12/2021 | |
| KR | | 200421166 | Y1 | * | 7/2006 | H04N 13/246 |
| TW | | 202448174 | A | * | 12/2024 | |
| WO | WO-2009048254 | | A1 | * | 4/2009 | H04N 23/67 |
| WO | WO-2013017618 | | A1 | * | 2/2013 | G06T 7/521 |
| WO | WO-2020243631 | | A1 | * | 12/2020 | A61B 34/32 |

OTHER PUBLICATIONS

"Performance Evaluation of Triangulation Based Range Sensors;" Guidi et al., Sensors (Basel, Switzerland), 10(8), 7192-7215; Jul. 29, 2010. (Year: 2010).*

"Experimental Comparison of Optical Inline 3D Measurement and Inspection Systems;" Traxler et al., IEEE Access (vol. 9, 2021, pp. 53952-53963); Jan. 1, 2021. (Year: 2021).*

P. T. Ly et al.: "Structured-Light-Based 3D Scanning System for Industrial Manipulator in Bin Picking Application", Australian & New Zealand Control Conference, pp. 34-39 (2022).

* cited by examiner

METHOD FOR ASSESSING AN OBJECT METHOD FOR MANIPULATING AN OBJECT, OPTICAL SYSTEM AND MANIPULATION SYSTEM

CROSS REFERENCE TO PRIOR APPLICATIONS

Priority is claimed to German Patent Application No. DE 10 2023 110 832.8, filed Apr. 27, 2023. The entire disclosure of said application is incorporated by reference herein.

FIELD

The present invention relates to a method for an optical acquisition of features of an object, wherein the object is located in an object position and comprises physical features in multiple dimensions and the object is optically accessible by an optical system, the optical system comprising at least a first optical device with a first adjustable spacial filter for acquiring optical information along a first optical axis, a second optical device with a second adjustable spacial filter for acquiring optical information along a second optical axis and an adjustment system enabled to adjust an acquisition angle between the first optical axis and the second optical axis. The invention further relates to a method for manipulating an object with a manipulating device according to the object features, wherein the object is located in an object position and comprises physical features in multiple dimensions. Furthermore, the invention relates to an optical system to acquire features of an object and a manipulation system to manipulate an object featuring a manipulation device to physically engage with the object.

BACKGROUND

Known methods for an optical acquisition of features of an object, respectively technical visual systems, are commonly based on a process of feeding object features, also called "teaching" object features, into the system or into a software or an artificial intelligence system. Based on this "teaching" the system is enabled to distinguish patterns and therefore to determine whether the seen object actually belongs to a specific class of objects as previously "taught".

For example, an optical system with a camera is taught with multiple different pictures of a technical item from different perspectives and, e.g., in different lighting situations, thus the system can identify certain patterns to later identify the technical object itself in another context. It shall be mentioned, that this example can also be transferred to methods that do not use classical optical technologies but similar physical effects in light and/or sound, e.g. ultrasonic recognition. Pertaining ultrasonic recognition, usually a distance and/or a derived shape can be acquired, but recognition can only be done by teaching patterns and features to a respective system.

In known methods for manipulating items, for example, in picking solutions for picking technical items for an assembly process, certain geometric features of the respective object have to be known beforehand. For example, for picking a specific bolt from a box of bolts, the bolt's features, like a length, the mainly cylindrical shape, ashade of the surface, etc., have to be taught to the system to identify a specific bolt. This, especially with shiny objects or objects with non-distinctive surface features, leads to problems in optically identifying and physically separating one certain bolt from a bulk of bolts, for example, in a box to pick bolts out of. Taking into consideration to use different technology as ultrasonic ranging and/or other wave-based detection systems like radar, lidar or the like, the problem of actually recognizing a single item itself remains.

All of these methods have in common that the specific object has to be at least partially known and determined before identifying and picking can be done. This leads to inflexible automation or handling processes such as manufacturing processes. An individual and independent identification of any object out of any context, therefore, is not possible with known technologies.

Other known methods for optical acquisition use specific predetermined settings to obtain at least some of the required information. Usually, this information is therefore estimated from a 2D-picture or other assessment of a scene and can only provide part of an information. Especially, this "depth perception" is, e.g., derived from a primary information. Monocular cues, such as motion parallax or perspective, need at least a background information about the setting or the scene to be at least partly accurate. Other technologies acquire only one information, which does not enable to fully understand depth. RADAR is able to capture motion or changing distances with relatively high accuracy. LIDAR can, under certain circumstances, capture a distance information that can help to understand depth for certain points in the field of view. A camera can capture color, as an array of pixels is used to represent a certain point in the field of view, e.g. for color and brightness.

To obtain a true understanding for "depth" from that information to understand shape, position and further properties of an object in the field of view, data stitching is necessary, which raises the need for massive computing power, especially when needed in short time or continuous manner. In addition, the reliability can be low.

Furthermore, technologies with additional projection systems can be used to acquire at least shape information as part of a required depth information. A pattern projection of known geometry and/or pattern can be projected on an object to calculate shape information from the stretched or bent resulting pattern to be seen by a camera. Usually, a stereo camera setup with a known distance between at least two lenses is needed to obtain a distance information and derive shape and size of the object. Stereo cameras can also be used without pattern projection, but then lack the ability to acquire shape information.

US 2021/0262789 A1 disclose a stereo camera system which is capable of gathering 3D-information by deriving data from a captured pattern projection. Therefore, a fixed distance, position and angle between two cameras is established.

JP 2021-190972 A discloses a 3D-measurement device with a stereoscopic camera system with a congestion angle detection. The congestion angle is part of a closed loop control system with the stereoscopic camera.

SUMMARY

The objective of the present invention is to improve the known state of the art.

In an embodiment, the present invention provides a method for an optical acquisition of features of an object. The object is located in an object position and comprises physical features in multiple dimensions. The object is optically accessible via an optical system. The optical system comprises a first optical device which comprises a first adjustable spacial filter which is configured to acquire optical information along a first optical axis, a second optical device which comprises a second adjustable spacial filter which is configured to acquire optical information along a second optical axis, and an adjustment system which is configured to adjust an acquisition angle between the first optical axis and the second optical axis. The method comprises aligning the optical system towards the object position so that the first optical device and the second optical device are arranged to gain an optical access to the object position, assessing the object with the first optical device and with the second optical device from a first perspective so that the first optical device engages with the object along the first optical axis from the first perspective and so that the second optical device engages with the object along the second optical axis from the first perspective, adjusting the first adjustable spacial filter of the first optical device and/or the second adjustable spacial filter of the second optical device to a defined spacial adjustment with a defined spacial adjustment parameter, wherein the defined spacial adjustment delivers a defined optical representation on the object and/or of the object, deriving a distance between the optical system and the object from the defined spacial adjustment parameter so as to derive a first distance information between the optical system and the object, and acquiring at least one of a location, a color, a shape and a size of the object as one of the physical features of the object

BRIEF DESCRIPTION OF THE DRAWINGS

The present invention is described in greater detail below on the basis of embodiments and of the drawings in which.

DETAILED DESCRIPTION

Figure 1:
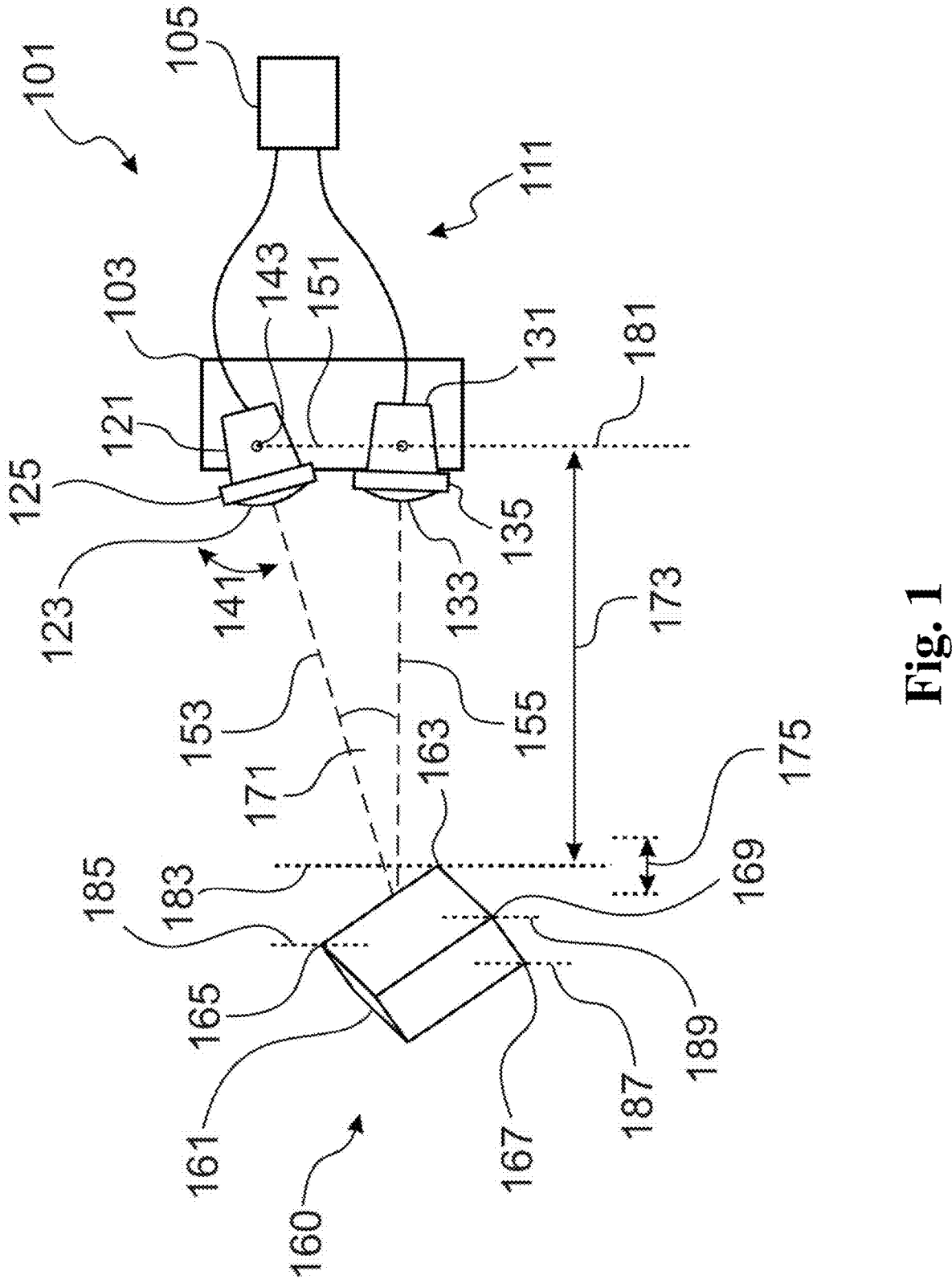
FIG. 1 shows a measurement arrangement with an optical system to assess an object.

The problem is solved by a method for an optical acquisition of features of an object, wherein the object is located in an object position and comprises physical features in multiple dimensions and the object is optically accessible by an optical system, the optical system comprising at least a first optical device with a first adjustable spacial filter for acquiring optical information along a first optical axis, a second optical device with a second adjustable spacial filter for acquiring optical information along a second optical axis and an adjustment system enabled to adjust an acquisition angle between the first optical axis and the second optical axis, comprising the following steps:

Aligning the optical system towards the object position, so that the first optical device and the second optical device are enabled to gain optical access to the object position, Assessing the object with the first optical device and the second optical device from a first perspective, so that the respective optical device engages with the object along each respective optical axis from the first perspective, Adjusting the adjustable spacial filter of the first optical device and/or of the second optical device to a defined spacial adjustment with a defined spacial adjustment parameter, wherein the defined spacial adjustment delivers a defined optical representation on the object and/or of the object, Deriving a distance between the optical system and the object from the defined spacial adjustment parameter, so that a first distance information between the optical system and the object is derived, such that the first distance information between the optical system and the object and/or location, color, shape and/or size of the object is acquired as a respective physical feature of the object.

Especially by adjusting the adjustable spacial filter, a first distance to the object can be easily derived, for example by adjusting the adjustable spacial filter to find a sharp representation or a specifically sought optical representation to determine a distance from the defined spacial adjustment parameter.

One core idea of the invention is to adjust, for example, a focus of a camera of at least one of the optical devices to find a specific distance of, for example, edges or relevant structures or other features of the object by relating the focal adjustment to a certain distance. It shall be mentioned, that the invention, including alternatives and embodiments described below, enables for assessing an object and deriving its properties, geometry or other desirable knowledge about the object despite a dynamic situation and/or unstructured environment. Also, there is no specific need for previous training of any of the elements of the optical system, specifically in relation to the assessed object and/or a scene around the object. The invention enables for an assessment of an object and construction of depth for the object and its surrounding with no need for previous training. Also, spacial temporal imaging or event imaging can be used to enhance the capability of the method, especially to enable the capability of focus adjustment based information gathering.

Another core idea of the invention for any of the presented embodiments is to provide a method for an optical and noncontact dynamic acquisition of manipulatable aspects and features of even a known or an unknown object, "unknown" referring to object whose feature has not been taught to the system and/or has not been programmed into the system. This enables for "spontaneous manipulation" of such unknown object, agnostic to variations in signal source, e.g. lighting variations, even when the object is presented with dynamic variations to its orientations and/or position.

As an example, the object is located in an object position and comprises physical features in multiple dimensions and the signal from the object is accessible for the sensing system.

Advantageously, the invention enables for the ability to observe multiple dimensions of information about the object using a single sensor, e.g. a fused sensor, which especially can make sensor fusion obsolete.

As utilized in accordance with the present disclosure, the following terms, unless otherwise indicated, shall be understood to have the following meanings.

At first, it shall be mentioned that the terms relating to "optics", "optical", "optically" and comparable terms are presented to describe systems acquiring visible light for easier understanding of the invention and as a good example for carrying out the invention. The scope of the invention, however, is also covering any system that is enabled to acquire energy medium contactless with either electromagnetic and/or mechanic, specifically acoustic, waves being transferred can be used in a similar way without leaving the scope of the invention. This applies for all embodiments and all aspects of the invention as described below.

A "method for an optical acquisition" is a method to optically assess an object to determine so-called "features" of an object. This, in particular, refers to a specifically contactless acquisition of those features by using either electromagnetic and/or mechanic, more specifically acoustic, wave propagation, interference or a comparable effect, while these features can represent any relevant nature of the object, like a position of the object, a shape of the object, an orientation of the object, one or multiple surface parameters of the object, a brightness or a reflectiveness of the object, furthermore mechanical features, like a rigidity of the object and/or a flexibility of the object in one or different parts of the object, especially under pressure or deformation. The optical acquisition itself therefore can be done, e.g., by either visible light, ultraviolet light, infrared light, interfering laser light, radar waves, radio frequencies or other electromagnetic wave in a suitable frequency band. Furthermore, a contactless system can also be presented via sound waves, e.g. ultrasonic waves being sent towards the object and being used to determine any features of the object. It shall also be mentioned, that a method according to this invention in any embodiment enables to detect and/or isolate even so called "mirror finished objects", such as shiny surfaced objects, mirror coated objects and objects being at least partly recognizable by reflections. This mostly applies for any lighting conditions and in a dynamically changing environment as, in this example, reflections on the mirror finished body change and are recognizable, such as color patterns. Pertaining sound or other energy transfer, this applies accordingly. E.g. a solid, rigid object comprises surfaces able to reflect sound. In certain embodiments of the invention, even this seemingly disadvantage can be overcome, or even used to gather more features of the object. As a general term either for optical and/or sound-based systems, "imaging of energy medium" can be used.

An "object", in this respect, can be any physical part or piece to be located in an "object position", for example in a box to be identified in, on a table, on a plate or in any other position or place which is accessible for a contactless system, especially an optical system, to carry out the method. Specifically, the object can be in a non-predetermined, unknown object orientation and position. The above-mentioned features of the object are specifically defined as "physical features in multiple dimensions", whereby the multiple dimensions include but also possibly exceed the six physically known spacial dimensions including rotational dimensions and also comprise "dimensions" that cannot be determined by geometrical matters, but comprise, for example, features usually only accessible by touching the object, such as optical features as stated above and/or mechanical features as rigidity or surface roughness.

"Being optically accessible" is defined by an unbiased view on the object with an "optical system" which can be represented by any projecting or receiving optical arrangement represented by technical parts, apparatus or contraption. For sound-based systems as described above, this would be defined by a similarly unbiased contact of the system with the object. In general, optical systems can be understood broadly, incorporating any non-contact sensing system, which also includes ultrasonic, radar, lidar and other similar systems. The optical system therefore comprises "optical devices" which, for example, are a projector and/or a camera system or the like to optically interact with the object by sending and/or by receiving light when light is the energy being used for acquisition. For ultrasonic systems, the respective "device" would be a recognition device based on sound, e.g. by using a sound source and a receiver similar to a light and a camera for optical systems, the same applies for other systems respectively.

A respective "adjustable spacial filter" is a system to interfere with light or any other energy format as pertaining the other options given above along an optical path from the object to the optical device and vice versa in a way that allows for an adjustment of one or different optical paths depending on the depth of projection or view or depending on a distance between the respective optical device and an adjustment point in space, respectively along an optical axis. Therefore, for example, an adjustable spacial filter can be a focus lens system to be adjusted to focus an optical path in a certain distance from the respective optical device. This can either be a focal system for focusing the projection on the object in a certain distance from the respective optical device and/or a focal system to focus an optical image from the object for a camera. Comparing this approach to the above-mentioned acoustic systems, this can be achieved by a focused speaker or resonator system in conjunction with a microphone, a directable microphone and/or a sound lens, e.g. embodied by an adjustably shaped structure to reflect sound according to the adjusted shape.

An "adjustment system" is enabled to adjust an acquisition angle between the first optical axis and the second optical axis, which, in other words, refers to, for example, a motor or an actuator to turn the respective optical device in a way that an angle between the first optical axis and the second optical axis can be adjusted. The "acquisition angle" for such optical systems usually can be set from 0°, which represents a parallel view of both optical devices, to an angle of 180°, which represents both optical devices facing each other, respectively. Usually, the acquisition angle will be set between 0° and 120°, whereby angles are based on a full circle of 360°. Other angles are possible, too.

It has to be mentioned that, with the adjustment of the acquisition angle, both optical devices can be adjusted relative to each other in a way that the first optical axis and the second optical axis meet and cross each other in a certain distance from the optical system.

"Aligning" the contactless, especially optical system towards the object position refers to positioning the optical system in a position in relation to the object where the optical access to the object is unbiased, so that the optical system can "see" the object freely and relatively undisturbed. In this respect, it is clear that an optical access to the object is impossible if any solid object blocks the respective optical axis. Furthermore, a dynamic alignment process can be performed, whereby the optical access angle or optical access path to the object is shifted and/or adjusted with purpose.

"Assessing" the object describes the specific act of using the optical system to gather information on the object in any way and/or to project any information onto the object with the optical system, respectively. A "first perspective" thereby refers to a starting position for the optical system to assess the object. This "first perspective" can either be a default position, for example for an optical system to start the assessment in relation to a roughly known object position, and/or can be randomly or purposely chosen freely in space to get a "view" of the object. When this view is established, the respective optical device "engages" with the object along the respective optical axis, therefore is able to interact optically with the object directly.

"Adjusting" the adjustable spacial filter of the respective optical device refers to actively changing a setting or parameter of the respective adjustable spacial filter and then, as a result, pursuing any adjustment until a defined spacial adjustment delivers a defined optical representation. The "defined spacial adjustment", in this respect, refers to a setting of the adjustable spacial filter, for example a focus depth that can be electronically read, respectively. The "defined optical representation" can be any specific optical state of the object or an interaction with the object, for example a sharp image in a specific depth plane or a specifically deterred or shifted image from a projection, as well as a sharp projection on the object in a certain distance. One primary core idea of the invention is to use the focal adjustment of the adjustable spacial filter to find a defined situation of the object that can be used to determine a distance to the object depending, e.g., on the focus.

"Deriving" a distance therefore refers to the act of using the defined spacial adjustment parameter of the adjustable spacial filter to refer to a distance to the object. In a simple example, the setting of the focus for a known distance can be used to determine a first distance information of, for example, a focused edge on an object. In a simple embodiment, this could also be pursued by reading the distance-related numbers on a focal ring of a camera lens when a focus for a certain feature of an object is established. In more complex embodiments, this can also be done by electronic sensors, software or other means.

A "first distance" in this respect specifically refers to a distance with some uncertainty. The first distance information can also include, in case of a camera system, a rough location of the object, a first impression of color, a first impression of shape and/or size of the object or other information pertaining a respective physical feature of the object.

In an embodiment, the first optical device or the second optical device comprises a projector, wherein the projector is arranged to project an optical projection on the object, wherein especially the optical projection is used to use the respective adjustable spacial filter.

A "projector" in this respect, for example, is a pattern projector or a similar projector to project an "optical projection" on the object. Such an optical projection, for example, can be a stripe pattern, a spot pattern or any other suitable pattern with illumination and darkness, colors, different shapes or the like in different places, to set a base for assessing the object based on that pattern. The optical projection, in other words, can be "used" to adjust the respective adjustable spacial filter, for example by finding focus of any detail of the optical projection to determine a physical feature of the object, for example to identify a surface or edge and its respective distance to the optical system. For acoustic systems or other energy medium systems, this can be achieved with similar means. In acoustics, e.g., this can be achieved by sending out interfering sound waves to be bent on edges of an object.

In another embodiment, the first optical device and/or the second optical device comprises and/or comprise an optical sensor, wherein the respective optical sensor is configured to capture an optical image of the object along the respective optical axis and the respective optical image is used to adjust the respective adjustable spacial filter.

An "optical sensor", in comparison to a projector, is suitable for assessing optical features by gathering and analyzing light received from the object. An optical sensor, therefore, can be a camera chip, a CCD camera, a CMOS camera or a comparable camera system in the visible or the invisible spectrum of light to capture an "optical image" of the object which is usually represented by pixels of the optical image. Therefore, optical information for any pixel in the optical image is present to be analyzed. A blurriness of pixels or a sharpness of the optical image can therefore be used to adjust the respective adjustable spacial filter, for example to identify a distance of an edge based on the focal depth in the optical image. This can be done, also for the above and below mentioned embodiments, either on the basis of visible light, but also UV-light, IR-light, radar, lidar or any other suitable wavelength of electromagnetic energy transfer, respectively. The term "imaging" shall be understood as generating any type of multi-dimensional impression of any form of energy. The techniques that are described and applied using the word "image" and its derivatives is applicable in every manifestation of the above definition.

In yet another embodiment, the acquisition angle between the first optical axis and the second optical axis is adjusted according to the first distance information, wherein especially the acquisition angle and an optical distance between the first optical axis and the second optical axis at an optical base of the respective optical device is used to calculate a second distance information for the distance between the optical system and the object, thus the second distance information especially features a higher precision than the first distance information.

By adjusting the acquisition angle and respectively matching the optical impression of both optical devices until the acquisition angle allows for assessing a specific point on the object, a triangulation, e.g., is possible to determine the more precise second distance to the object by using trigonometric calculations based on the distance between optical devices and the acquisition angle.

By consecutively adjusting the acquisition angle, a simulated impression of motion can be generated, which, by analyzing the consecutive pictures obtained over the succession of adjustments, can enhance the impression of the object widely.

Therefore, for any of the given options, the rough adjustment of the acquisition angle can also be based on the first distance determined by the adjustment of the adjustable spacial filter or adjustable spacial filters. This especially shortens the time of actually "finding" the right acquisition angle to match with the actual distance to the object. The acquisition angle can, e.g., physically found by matching respective pixels in respective optical impressions from the first optical device and the second optical device and thus compensating for the distance between the two optical devices.

To enhance the precision of the assessment and/or to gain access to even more physical features of the object, the optical system is moved relatively to the object, especially moved along a path non-linear to one and/or either of the optical axes, such that the optical system is enabled to assess the object from a second perspective or any further perspective, wherein especially the respective adjustable spacial filter and/or the acquisition angle is or are adjusted dynamically, thus shape, size, reflection properties and/or orientation of the object is or are acquired as a respective physical feature of the object.

For this embodiment, consecutive motion can also enhance the acquired information of the object. E.g., a consecutive motion of the optical system along a known path can generate an impression of the object from different perspectives. Thus, an extraction of, e.g., texture, color or contours can be used for any of the different images which are generated along the known path.

In addition or as an alternative, motion cues and/or spatial temporal events of amplitude of acquired optical information can be used to allocate different properties such as texture, color, contours, shape or distance to certain parts of the object. This can include the allocation of similar or likely information for any location in an obtained picture, for example. Also, spacial temporal events of a certain amplitude can be used for this purpose. Those could be triggered by internal or external stimuli.

It must be mentioned that the method can, for example, be realized on a strong calculating force of, for example, a computer that gathers and uses the data from the optical devices, the adjustable spacial filter and/or the adjusted acquisition angle as well as other acquired information to calculate physical features of the object. Therefore, picture analysis, similarity matching and/or other algorithms can be used.

In yet another embodiment, which can also be applied to any of the previous embodiments, the respective physical feature of the object or respective physical features of the object is or are determined by matching comparable optical impressions for neighboring locations in a respective optical representation of the object, especially while adjusting the respective adjustable filter, the acquisition angle and/or while the optical system is moved.

Therefore, changes in the optical impression can be mathematically highlighted, as, for example, distinctive shapes of an object can be filtered from the optical impression, respectively from a picture of the object from the different perspectives of the two optical devices, as a result the edge, corner or any other distinctive geometric feature, for example, can be determined precisely. This embodiment, together with one or several of the previous or following embodiments, takes advantage of thee fact that changes in a picture or in a different optical impression are easier to determine than filtering any features from a static image. Therefore, also the information about a known position of the optical system can be included in the calculation. In multiple and/or consecutive steps, the change of the respective adjustable spacial filter, the adjustment of the angle between the two optical axes and also a movement of the optical system itself induce changes to the respective optical impression that enable to match neighboring locations with a growing detailing grade. This also enables the system to "see" or detect motion and/or change in multiple dimensions, resulting in the system to be able to associate the information about the object. In this respect it has to be understood, that color differentiates points, pixels and/or features while motion associates these features to certain positions, pixels or groups of features.

Motion, both macroscopic for the optical system or detailed for any of the given options to adjust, also allows to understand the vectors and/or directions of change and amplitude of change in every region of the image. In a simple example, a shiny edge of an object will give a good reference point in space to be viewed from different perspectives and therefore located to a certain coordinate in the object space by the system. Changes is reflection will occur gradually while changing focus, angle or position and thus can be matched by picture analysis. The more movement and the more changes in the optical impressions can be used, the better the assessment of the object's features itself.

Especially, a respective physical feature of the object or respective physical features of the object is or are determined by combining respective matching comparable optical impression from neighboring locations in different optical impressions.

In yet another embodiment, the object is determined from other objects in the vicinity of the object position by adjusting the respective adjustable spacial filter of the first optical device and/or the second optical device to a defined spacial adjustment, especially adjusting the respective adjustable spacial filter from a close assumed distance between the optical system and the object to a far distance between the optical system and the object.

With this embodiment, depth in the optical impressions can be used to determine different objects from each other.

It has to be additionally mentioned, that for any of the previously described options and embodiments, a commonly known problem of "distortion" by optical aberrations of lenses and other parts of optical systems can be avoided or tolerated. With any of the previous embodiments, the tolerance for aberrations can be improved. Especially a dynamic motion of the optical system in relation to the object enables for more field of view and thus enables for converging a number of taken images or optical impressions on the region of interest or a specific part of the object.

In another aspect, the problem is solved by a method for manipulating an object with a manipulating device according to the object features, wherein the object is located in an object position and comprises physical features in multiple dimensions, comprising the following steps:

Acquiring an optical feature or optical features of the object, using a method according to one or any of the previous embodiments, so that a distance information between the optical system and the object, a location, a color, a shape and/or a size of the object is acquired as a respective physical feature of the object, Manipulating the object with a manipulation device while controlling the manipulation device according to the acquired respective physical feature or the respective physical features of the object, such that the object is manipulated according to the object's features.

It is one key idea of this aspect of the invention that an acquired optical feature in any of the above mentioned "dimension" of the object can be used to manipulate the object with purpose. For example, a position, an orientation and a shape of the object can be used to determine the position of the object and a possibility to grasp the object or to push the object in a certain direction. In this respect, the high quality and capability of the method for an optical acquisition of features of an object described previously in any of its embodiments can be used to acquire the features of the object needed for a manipulation process.

In one embodiment, the manipulation device features a grasping device enabled to grasp the object physically, while grasping movement of the grasping device is controlled according to the acquired respective physical feature or the respective physical features of the object, while especially a change of a physical feature or a change of physical features of the object is acquired to determine a physical feature of the object.

This embodiment takes advantage of the interaction of the manipulation device with the object itself. A grasping device, for example, can be used to pick and place the object according to the acquired optical features. A "change of a physical feature" of the object, in this respect, refers to, for example, a change in shape of the object by grasping the object with a certain grasping force. For example, picking a solid metal object will not lead to any shape changes of the metal object by grasping it with a set of pliers on a robot, while grasping a cushion will most definitely lead to a change of the cushion's shape that can be assessed by the above-mentioned methods, respectively, therefore, the change itself is acquired to determine a physical feature or a change in a physical feature of the object or to enhance the information about one or more physical features of the object. As an example, a cushion is determined in shape, orientation and location by assessing its position and its edges optically at first. Therefore, a picking strategy can be calculated in 3D-space to control the manipulation device, for example a set of pliers on a robot, to pick the cushion. The set of pliers, especially equipped with a system to measure their pressure to the object and/or grasping force, then is used to feedback the information about the grasping process, respectively a grasping force. In parallel, the optical assessment as mentioned above is further pursued or repeated. The renewed optical information, e.g. a determined change in shape induced by the grasping, can be matched with the measured grasping force. Therefore, even an elasticity can be mathematically determined for the cushion picked by the robot system and stored as a new "dimension" of a physical feature of the cushion.

In yet another aspect of the invention, the problem is solved by an optical system to acquire features of an object, wherein the object is located in an object position and comprises physical features in multiple dimensions, while the optical system is configured to perform a method according to the above-mentioned embodiments.

In yet another aspect, the problem is solved by a manipulation system to manipulate an object featuring a manipulating device to physically engage with the object, configured to perform a method as presented above.

Further aspects of the present invention will be apparent from the figures and from the description of particular embodiments as A measurement arrangement 101 features an optical system 111. The optical system 111 comprises a carrier 103 that carries a first camera 121 and a second camera 131. The first camera 121 features a lens 123 and a focus 125. The focus 125 enables for focusing the light entering through the lens 123 in the camera 121 dependent on a distance to the camera 121. The camera 131 features a lens 133 with a focus 135 and is built similarly to the camera 121. In the shown example (compare also FIG. 1), the camera 121 can be rotated with a rotation 141 around a pivot point 143 on the carrier 103. Therefore, an angle 171 between an optical axis 153 of the camera 121 and an axis 155 of the camera 131 can be adjusted respectively.

An object 161 is located in an object position 160 in the vicinity of the optical system 111 in a way that the optical system 111 can assess the object 161 without optical disturbance. The object itself features corners 163, 165, 167 and 169. In the perspective shown in FIG. 1, the optical system 111 can assess the corner 163, the corner 165 as well as the corner 169. The corner 167 is located in a position where there is no direct optical access for the optical system 111. It shall be mentioned, that as a substitute for one of the cameras a projector could be used to project, e.g., a stripe pattern, on the object 161 to be viewed by the respective camera. In the following, the system shall be explained based on the described arrangement with camera 121 and 131:

The object 161 is now assessed by the optical system 101 by adjusting either one of the focuses 125 and/or 135 to focus on different planes in a distance of the cameras 121 and 131.

The corner 163, located in a plane 183, for example, is in focus and a reading from the focus 125 and/or 135 is used to determine a distance 173 of the plane 183. Still, due to the rough assessment with the focuses 125 and 135, there is an uncertainty 175 to the distance 173. A plane 185 crossing the corner 165 as well as a plane 189 crossing the corner 169 are out of focus and thus not directly detected.

The specific optical information, respectively the picture of the object 161 focused on the plane 183 is now assessed by a computer 105 connected to and controlling the cameras 121 and 131 to, for example, determine the color and position of the pixels representing the corner 163. Further picture analysis can be performed, if suitable for assessing more information about the object in this stage of the process.

A distance information is derived both from the setting of the focus 125 and 135 as a first assessment and more precisely by the angle 171 now adjusted by turning the camera 121 around the pivot point 143 until the optical axes 153 and 155 match to meet the corner 163 and thus enabling for both pictures of both camera 121 and 131 to match each other respectively. This match can be performed by comparing pixel properties of both pictures taken by camera 121 as well as 131. A precise value for the distance 173 is now calculated by using a distance 151 in a base plane 181 through the cameras 121 and 131. Using the distance 151 between the two cameras and the angle 171, also possibly enhanced with an angle sensor (non-shown) on each of the cameras, enables for a triangulation of the exact position of corner 163 in a three-dimensional space.

In the same manner, also the corners 165 and 169 are located and assessed by the optical system 111, respectively in consecutive steps.

It shall be mentioned that the color and position of each pixel can then be processed by picture analysis to enable for figuring reflection grades, shininess, roughness of the surface and the like by software.

Figure 2:
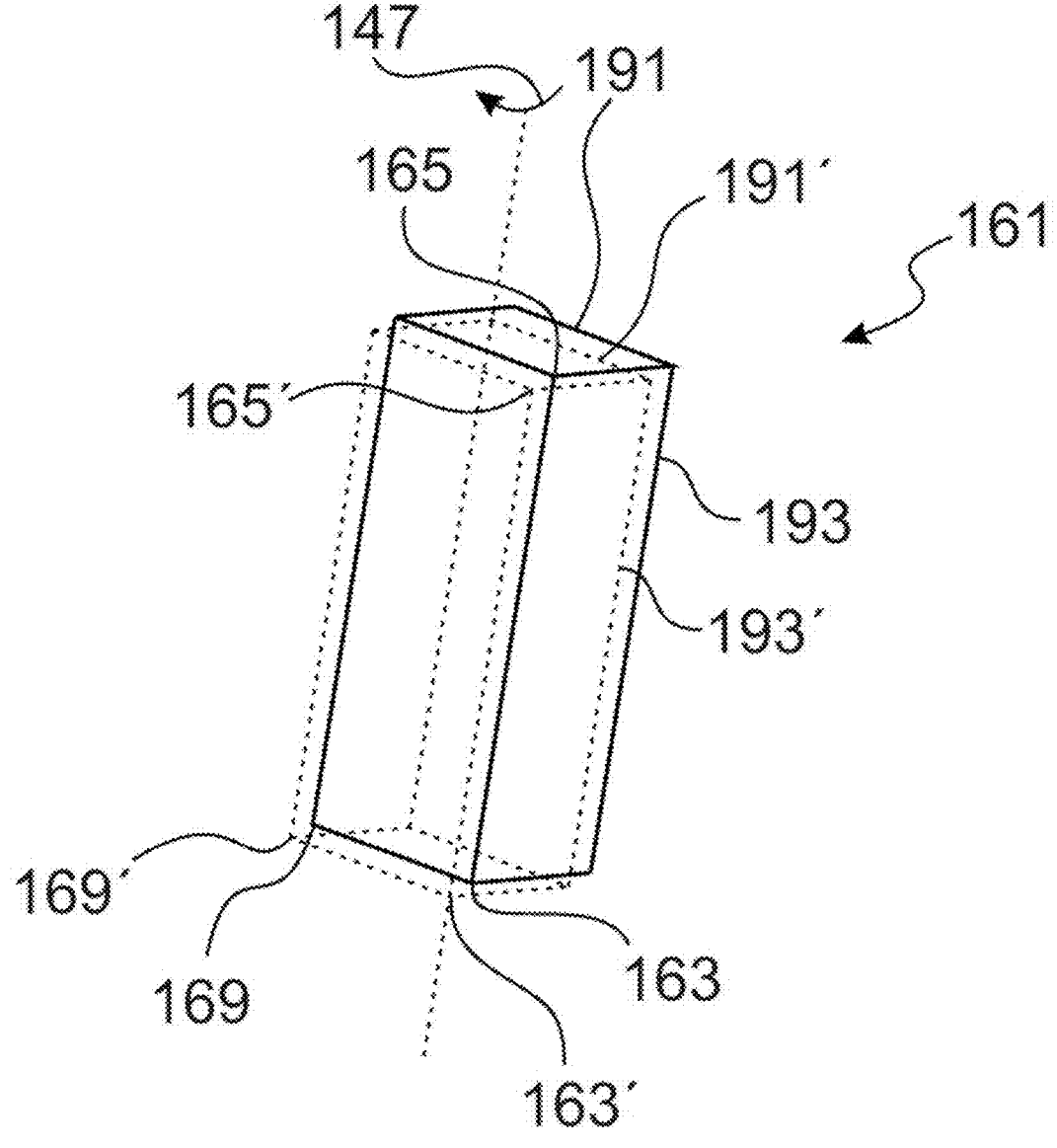
FIG. 2 shows a detailed isometric view on the object of FIG. 1 in changing positions.
Figure 3:
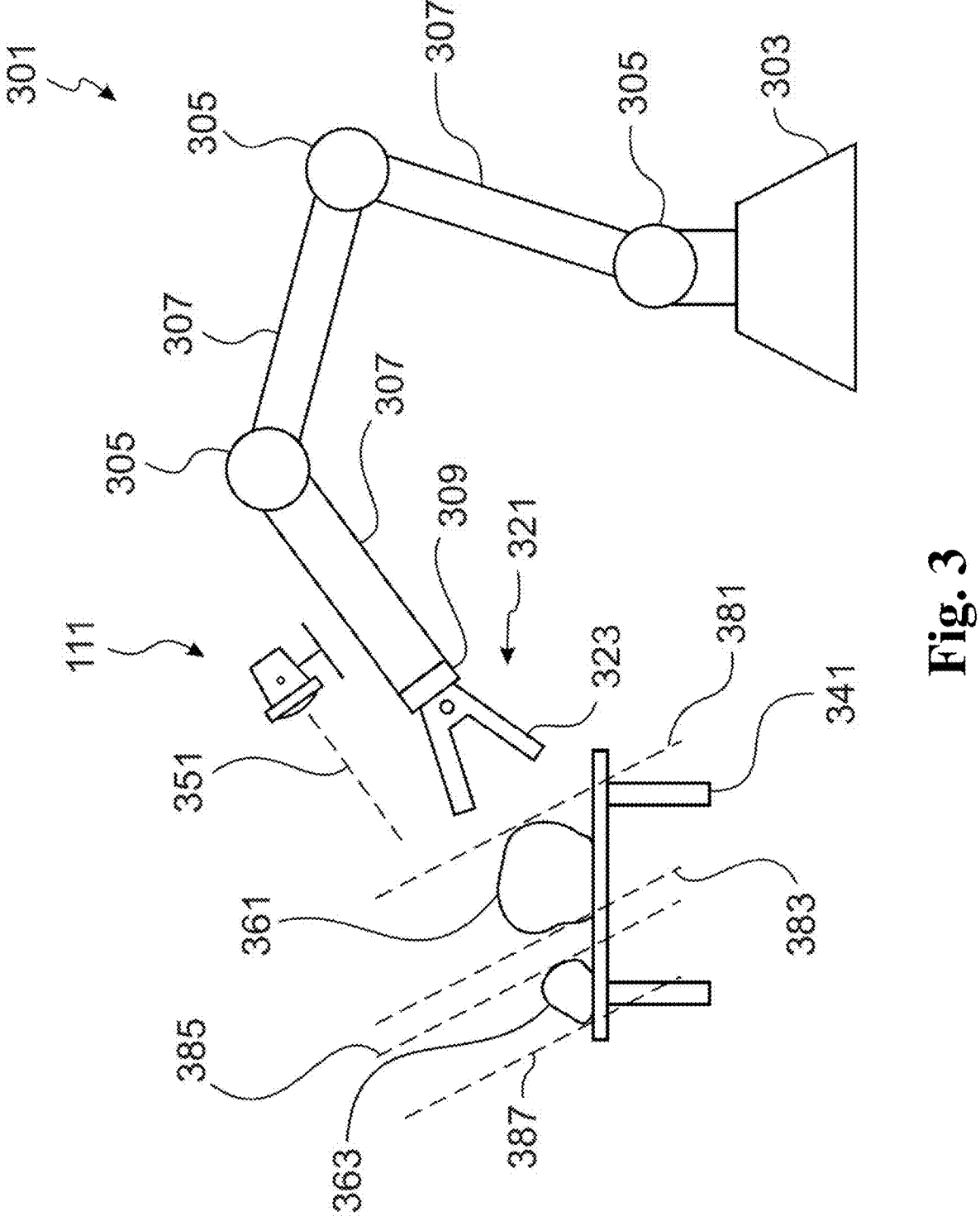
FIG. 3 shows a robot with an optical system as shown in FIG. 1 engaging with objects.

For the following, as depicted in FIG. 2, it shall be assumed that the optical system 111 is temporarily moved in space in relation to the object 161 and the actual picture of the object 161 changes in view of the cameras 121 and 131. This can, e.g., be by a robot or a linear motion system (not shown). A rotation 147 is assumed for the object 161 in relation to the optical system 111, while the corner 163 shifts to a position of a corner 163' and other corners, respectively. The same applies to edges 191 shifting to be an edge 191' and an edge 193 shifting to be an edge 193'.

Therefore, change and motion is induced, while the focus 125 and 135 as well as the angle 171 between the optical axes 153 and 155 are adjusted continuously to gain more information of the object 161. For example, the pixel representing corner 163 as mentioned above shifts in space and can be tracked by, for example, comparing color, brightness and/or reflection grade to be matched to be "the same" corner as the seen corner 163'. The same applies to other features of the object 161, thus a more detailed information cloud for the object 161 can be determined, corners, edges and shape can be assessed, position and orientation in space can be found.

A robot 301 is equipped with the optical system 111 described above. The robot features a base 303 and joints 305, each linking arms 307 together to support a hand 309. The robot 301 therefore is a 6-axes industrial robot. On the hand 309, pliers 321 are mounted. The pliers 321 feature fingers 323 and are equipped with a sensor to determine the force of grasping with the fingers 323.

On a table 341, objects 361 and 363 are located. The robot 301 is tasked with the objective to grasp object 361 in a roughly known position, while no further information about the object itself is present. The optical system 111 has a clear view on the table 341 with the objects 361 and 363 along an axis 351. The assessment of the objects is done as mentioned above, while the object 361 is oriented and positioned between a plane 381 and a plane 383 and the object 363 is positioned between planes 385 and 387, respectively in a farther distance to the robot 301.

By adjusting focus 125 and 135, the angle 171 and by moving the robot's hand's position in space in relation to the object 361, the differentiation between the two objects 361 and 363 is done by assessing their different distances, and the object 361 is assessed in shape and orientation in space by the method described above. The robot 301 is then controlled in a way to grasp the object 361 with the fingers 325 of the pliers 321 according to the previously assessed edges and corners.

Figure 4:
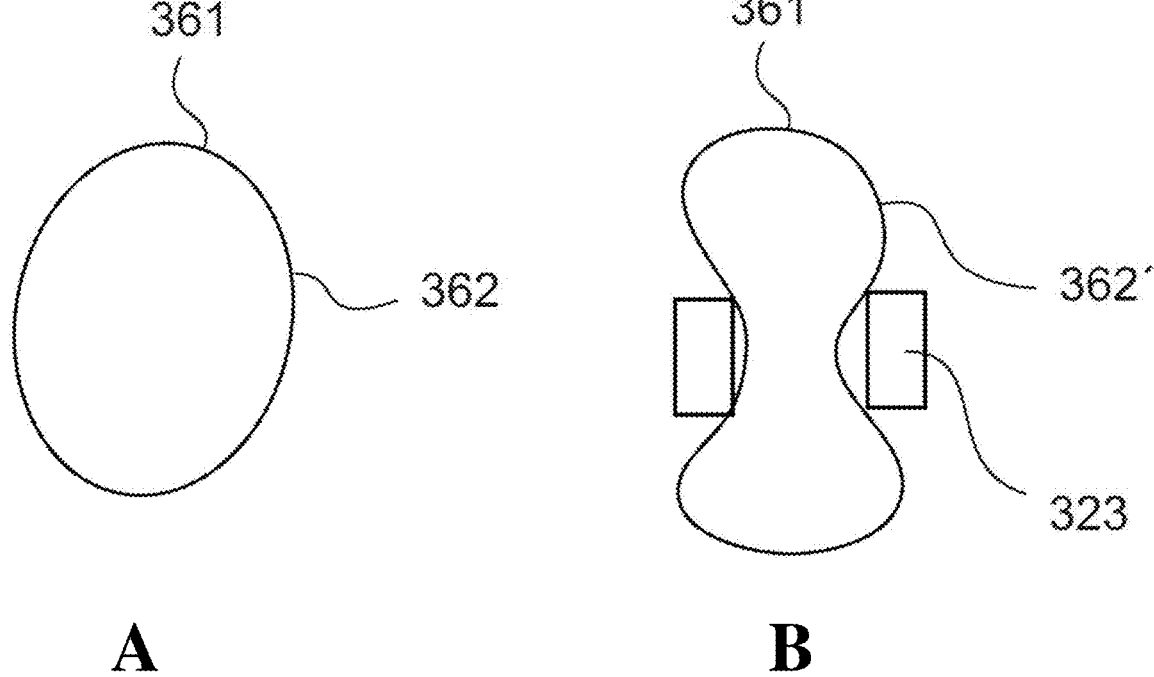
FIG. 4 shows a detailed view on the objects of FIG. 3 in different shapes (a and b).

It shall be assumed that object 361 is "soft", e.g. being an object made of a soft plastic foam, thus enabled to be compressed by force. In its usual shape, object 361 features a contour 362. When grasped by the fingers 323, the object 361 deforms to an object 361' with a contour 362' (compare also FIGS. 4a and b), caused by the force of the fingers 323. The assessment of the object 361' is further and repeatedly pursued by the optical system 111, thus the deformation is recognized by matching previous edges of the object 361 to deformed edges by comparing properties of certain pixels. There is also a correlation made between the sensor to determine the grasping force of the pliers 321 with the deformed object 361'. Therefore, a rigidity of the object 361 can be determined as a further property.

The present invention is not limited to embodiments described herein; reference should be had to the appended claims.

LIST OF REFERENCE NUMERALS

101 Measurement Arrangement
103 Carrier
105 Computer
111 Optical System
121 Camera/First optical device
123 Lens
125 Focus/First adjustable spacial filter
131 Camera/Second optical device
133 Lens
135 Focus/Second adjustable spacial filter
141 Rotation
143 Pivot Point/Adjustment system
147 Rotation
151 Distance
153 Axis/First optical axis
155 Axis/Second optical axis
160 Object position
161 Object
163 Corner
163' Corner
165 Corner
165' Corner
167 Corner
167' Corner
169 Corner
169' Corner
171 Angle/Acquisition angle
173 Distance
175 Uncertainty
181 Baseplane
183 Plane
185 Plane
187 Plane
189 Plane
191 Edge
191' Edge
193 Edge
193' Edge
301 Robot/Manipulation System
303 Base
305 Joint
307 Arm
309 Hand
321 Pliers
323 Finger/Grasping device
341 Table/Object position
351 Axis
361 Object
361' Object
362 Contour
362' Contour
363 Object
381 Plane/Close assumed distance
383 Plane
385 Plane
387 Plane/Far distance

What is claimed is:

1. A method for an optical acquisition of features of an object, wherein the object is located in an object position and comprises physical features in multiple dimensions, and the object is optically accessible via an optical system, the optical system comprising:

a first optical device which comprises a first adjustable spacial filter which is configured to acquire optical information along a first optical axis;

a second optical device which comprises a second adjustable spacial filter which is configured to acquire optical information along a second optical axis; and an adjustment system which is configured to adjust an acquisition angle between the first optical axis and the second optical axis, the method comprising:

aligning the optical system towards the object position so that the first optical device and the second optical device are arranged to gain an optical access to the object position;

assessing the object with the first optical device and with the second optical device from a first perspective so that the first optical device engages with the object along the first optical axis from the first perspective and so that the second optical device engages with the object along the second optical axis from the first perspective;

adjusting the first adjustable spacial filter of the first optical device and/or the second adjustable spacial filter of the second optical device to a defined spacial filter adjustment with a defined spacial filter adjustment parameter, wherein the defined spacial filter adjustment delivers a defined optical representation on the object and/or of the object;

deriving a distance between the optical system and the object from the defined spacial filter adjustment parameter so as to derive a first distance information between the optical system and the object;

acquiring at least one of a location, a color, a shape and a size of the object as one of the physical features of the object;

adjusting the acquisition angle between the first optical axis and the second optical axis based on the first distance information until the first optical axis and the second optical axis intersect at a common point on the object by matching optical impressions from the first optical device and the second optical device; and calculating a second distance information using the acquisition angle and a distance between the first optical axis and the second optical axis at a baseplane of the first optical device and the second optical device, the second distance information having a higher precision than the first distance information.

2. The method as recited in claim 1, wherein, the first optical device or the second optical device further comprises a projector, and the method further comprises:

arranging the projector of the first optical device or of the second optical device to project an optical projection on the object; and if the first optical device comprises the projector, using the optical projection to adjust the first adjustable spacial filter, and if the second optical device comprises the projector, using the optical projection to adjust the second adjustable spacial filter.

3. The method as recited in claim 1, wherein, the first optical device and/or the second optical device further comprises an optical sensor, and the method further comprises:

configuring the optical sensor of the first optical device to capture an optical image of the object along the first optical axis and/or configuring the optical sensor of the second optical device to capture an optical image of the object along the second optical axis; and using the optical image captured by the optical sensor of the first optical device to adjust the first adjustable spacial filter and/or using the optical image captured by the optical sensor of the second optical device to adjust the second adjustable spacial filter.

4. The method as recited in claim 1, further comprising:

moving the optical system relative to the object along a path which is non-linear to the first optical axis and/or non-linear to the second optical axis; and assessing, via the optical system, the object from a second perspective, wherein, the first adjustable spacial filter, the second adjustable spacial filter and/or the acquisition angle is/are adjusted dynamically so as to acquire the shape, the size, a reflection property and/or an orientation of the object as one of the physical features of the object.

5. The method as recited in claim 1, further comprising:

determining one or more of the physical features of the object by matching a comparable optical impression for neighboring locations in the defined optical representation of the object.

6. The method as recited in claim 5, wherein the determining of the one or more of the physical features of the object by matching the comparable optical impression for the neighboring locations in the defined optical representation of the object is performed while adjusting the first adjustable spacial filter, the second adjustable spacial filter and/or the acquisition angle, and/or while moving the optical system.

7. The method as recited in claim 5, wherein the determining one or more of the physical features of the object by matching the comparable optical impression for neighboring locations in the defined optical representation of the object further includes combining respective matching comparable optical impressions from the neighboring locations from different perspectives.

8. The method as recited in claim 1, further comprising:

determining the object from other objects in a vicinity of the object position by adjusting the first adjustable spacial filter of the first optical device and/or the second adjustable spacial filter of the second optical device to a defined spacial filter adjustment.

9. The method as recited in claim 8, wherein the determining of the object from the other objects in the vicinity of the object position by adjusting the first adjustable spacial filter of the first optical device and/or the second adjustable spacial filter of the second optical device to the defined spacial filter adjustment is performed by adjusting the first adjustable spacial filter and/or the second adjustable spacial filter from a close assumed distance between the optical system and the object to a far distance between the optical system and the object.

10. A method for manipulating an object with a manipulating device according to features of the object, wherein the object is located in an object position and comprises physical features in multiple dimensions, the method comprising:

acquiring the first distance information between the optical system and the object, the second distance information between the optical system and the object, and at least one of the location, the color, the shape, and/or the size of the object as the one of the physical features of the object pursuant to the method as recited in claim 1;

manipulating the object with the manipulation device while controlling the manipulation device according to the one of the physical features of the object acquired; and manipulating the object based on the physical features of the object.

11. The method as recited in claim 10, wherein the manipulation device comprises:

a grasping device which is configured to grasp the object physically, wherein, a grasping movement of the grasping device is controlled via the physical features of the object.

12. The method as recited in claim 11, wherein one or more of the physical features of the object is determined by, acquiring a change of one or more of the physical features of the object; and determining a physical feature of the object based on the change.

13. A manipulation system which is configured to manipulate an object, the manipulation system comprising:

a manipulating device which is configured to physically engage with the object, wherein, the manipulating device is configured to perform the method as recited in claim 11.

14. An optical system which is configured to acquire features of an object, wherein, the object is located in an object position and comprises physical features in multiple dimensions, and the optical system is configured to perform the method as recited in claim 1.

15. The method as recited in claim 1, further comprising:

determining the object from other objects in a vicinity of the object position by adjusting the first adjustable spacial filter of the first optical device and/or the second adjustable spacial filter of the second optical device to a defined spacial filter adjustment.

16. A method for an optical acquisition of features of an object, wherein the object is located in an object position and comprises physical features in multiple dimensions, and the object is optically accessible via an optical system, the optical system comprising:

a first optical device which comprises a first adjustable spacial filter which is configured to acquire optical information along a first optical axis;

a second optical device which comprises a second adjustable spacial filter which is configured to acquire optical information along a second optical axis; and an adjustment system which is configured to adjust an acquisition angle between the first optical axis and the second optical axis, the method comprising:

aligning the optical system towards the object position so that the first optical device and the second optical device are arranged to gain an optical access to the object position;

assessing the object with the first optical device and with the second optical device from a first perspective so that the first optical device engages with the object along the first optical axis from the first perspective and so that the second optical device engages with the object along the second optical axis from the first perspective;

adjusting the first adjustable spacial filter of the first optical device and/or the second adjustable spacial filter of the second optical device to a defined spacial filter adjustment with a defined spacial filter adjustment parameter, wherein the defined spacial filter adjustment delivers a defined optical representation on the object and/or of the object;

deriving a distance between the optical system and the object from the defined spacial filter adjustment parameter so as to derive a first distance information between the optical system and the object;

acquiring at least one of a location, a color, a shape and a size of the object as one of the physical features of the object;

adjusting the acquisition angle between the first optical axis and the second optical axis based on the first distance information until the first optical axis and the second optical axis intersect at a common point on the object by matching optical impressions from the first optical device and the second optical device;

calculating a second distance information using the acquisition angle and a distance between the first optical axis and the second optical axis at a baseplane of the first optical device and the second optical device, the second distance information having a higher precision than the first distance information;

moving the optical system relative to the object along a path which is non-linear to the first optical axis and/or non-linear to the second optical axis; and assessing, via the optical system, the object from a second perspective, wherein, the first adjustable spacial filter, the second adjustable spacial filter and/or the acquisition angle is/are adjusted dynamically so as to acquire a reflection property of the object as one of the physical features of the object.

17. The method as recited in claim 16, wherein, the first optical device and/or the second optical device further comprises an optical sensor, and the method further comprises:

configuring the optical sensor of the first optical device to capture an optical image of the object along the first optical axis and/or configuring the optical sensor of the second optical device to capture an optical image of the object along the second optical axis; and using the optical image captured by the optical sensor of the first optical device to adjust the first adjustable spacial filter and/or using the optical image captured by the optical sensor of the second optical device to adjust the second adjustable spacial filter.

18. A method for an optical acquisition of features of an object, wherein the object is located in an object position and comprises physical features in multiple dimensions, and the object is optically accessible via an optical system, the optical system comprising:

a first camera which comprises a first adjustable spacial filter which is configured to acquire optical image along a first optical axis;

a second camera which comprises a second adjustable spacial filter which is configured to acquire optical image along a second optical axis; and an adjustment system which is configured to adjust an acquisition angle between the first optical axis and the second optical axis, the method comprising:

aligning the optical system towards the object position so that the first camera and the second camera are arranged to gain an optical access to the object position;

assessing the object with the first camera and with the second camera from a first perspective so that the first camera engages with the object along the first optical axis from the first perspective and so that the second camera engages with the object along the second optical axis from the first perspective;

adjusting the first adjustable spacial filter of the first camera and/or the second adjustable spacial filter of the second camera to a defined spacial filter adjustment with a defined spacial filter adjustment parameter, wherein the defined spacial filter adjustment delivers a defined optical representation on the object and/or of the object;

deriving a distance between the optical system and the object from the defined spacial filter adjustment parameter so as to derive a first distance information between the optical system and the object;

acquiring at least one of a location, a color, a shape and a size of the object as one of the physical features of the object;

adjusting the acquisition angle between the first optical axis and the second optical axis based on the first distance information until the first optical axis and the second optical axis intersect at a common point on the object by matching optical impressions from the first camera and the second camera; and calculating a second distance information using the acquisition angle and a distance between the first optical axis and the second optical axis at a baseplane of the first camera and the second camera, the second distance information having a higher precision than the first distance information, wherein, the first adjustable spacial filter and/or the second adjustable spacial is adjusted using a blurriness of pixels of the optical image.

19. The method as recited in claim 18, further comprising:

moving the optical system relative to the object along a path which is non-linear to the first optical axis and/or non-linear to the second optical axis; and assessing, via the optical system, the object from a second perspective, wherein, the first adjustable spacial filter, the second adjustable spacial filter and/or the acquisition angle is/are adjusted dynamically so as to acquire the shape, the size, a reflection property and/or an orientation of the object as one of the physical features of the object.

20. The method as recited in claim 18, further comprising:

determining the object from other objects in a vicinity of the object position by adjusting the first adjustable spacial filter of the first camera and/or the second adjustable spacial filter of the second camera to a defined spacial filter adjustment.

\* \* \* \* \*